US006429542B1

(12) United States Patent
Furuya et al.
(10) Patent No.: US 6,429,542 B1
(45) Date of Patent: Aug. 6, 2002

(54) MULTI-FUNCTION SWITCH SYSTEM

(75) Inventors: Yoshiyuki Furuya; Kunimitsu Aoki, both of Shizuoka-ken (JP)

(73) Assignee: Yazaki Corporation, Tokyo (JP)

(*) Notice: Subject to any disclaimer, the term of this patent is extended or adjusted under 35 U.S.C. 154(b) by 52 days.

(21) Appl. No.: 09/575,670

(22) Filed: Jun. 16, 2000

(30) Foreign Application Priority Data

Jun. 18, 1999 (JP) .......................................... 11-173029

(51) Int. Cl.[7] .................................................. B60L 1/00

(52) U.S. Cl. ....................................... 307/9.1; 307/10.1

(58) Field of Search ................................ 307/9.1, 10.1; 345/169, 339, 341, 349; 701/36; 340/825.69

(56) References Cited

U.S. PATENT DOCUMENTS 5,539,429 A * 7/1996 Yano et al. ................. 345/173
5,821,935 A * 10/1998 Hartman et al. ............ 345/349
5,847,704 A * 12/1998 Hartman ..................... 345/339
5,916,288 A * 6/1999 Hartman ...................... 701/36
5,940,007 A * 8/1999 Brinkmeyer et al. ... 340/825.69
6,285,357 B1 * 9/2001 Kushiro et al. ............. 345/169

* cited by examiner

*Primary Examiner*—Brian Sircus
*Assistant Examiner*—Sharon Polk
(74) *Attorney, Agent, or Firm*—Finnegan, Henderson, Farabow, Garrett, & Dunner, L.L.P.

(57) ABSTRACT

A multi-function switch device for systems includes a case body, a mode selection switch on the case body, a display unit and a drive circuit both accommodated in the case body. The case body is provided with a transparent display window and a plurality of clear keys made of transparent material. By manipulating the mode selection switch, and operator can designate any one of respective operational modes of the systems. The display unit is positioned under the transparent display window and the clear keys. In the display unit, there are defined a mode-display area for indicating the so-designated operational mode of the system through the transparent display window and a plurality of operation-display areas for indicating various operative conditions in the corresponding system through the clear keys, respectively.

5 Claims, 5 Drawing Sheets

MULTI-FUNCTION SWITCH SYSTEM

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION

Description of Related Art

In general, an operating panel in which switches for operating various systems such as an air conditioner and an audio system disposed in a vehicle are incorporated, is disposed in the vicinity of a driver's seat. Some vehicles have a switch also on a rear seat side for operating the air conditioner, but a user must move to the seat position to operate the rear side switch. The same can be said for the audio system.

Such an inconvenience can be overcome by providing the operating panel with a remote control function so that the driver can operate the rear side switch while sitting on the driver's seat.

However, in the conventional structure, the number of switches which can be operated utilizing the remote control function is limited and is extremely small, and the position of the switch is irrelevant to a position of the user (position of the seat). That is, no consideration is given to a user for easily finding the particular portion to be operated from various portions in the vehicle.

In recent years, video systems and headphone system connected to DVDs and the like have become widespread. In this case, a plurality of persons may simultaneously use a sound source through individual headphones, and if the operating panel has the remote control function only like the conventional switch, operation for operating the system becomes difficult.

Further, in a conventional power window switch system, power window switches capable of opening and closing windows of all the seats are collectively disposed, and a window glass of each seat is opened and closed using an exclusive switch of the seat. Therefore, when a vehicle has seats in three rows for example, it is impossible to operate a front seat side window glass from a rear seat.

As described above, the conventional switch system is not designed such that a particular function to be operated can easily be found from various portions in a vehicle, and there is a problem that it is troublesome to select and operate a desired switch function corresponding to the particular portion from the various switch functions.

For example, Japanese Patent Application Laid-open No. H9-109801 disclosed a collective switch in which switches corresponding to various portion of a vehicle is provided on a case having a vehicle's shape so that a user can easily find and operate the system of a particular portion to be operated from various systems of the vehicle.

However, this collective switch has only one switch function for a particular portion. Therefore, there is a problem that this switch cannot be applied to a case in which the particular portion has a plurality of systems and these systems are individually operated.

FIELD OF THE INVENTION

The present invention relates to a multi-function switch system for operation of various systems of a vehicle for example, and more particularly, to a multi-function switch capable of easily finding a particular system to be operated from various systems a vehicle, and capable of easily and reliably selecting and operating a desirable switch function corresponding to the particular system from various switch functions.

SUMMARY OF THE INVENTION

It is an object of the present invention to provide a multi-function switch system capable of easily finding a particular system to be operated from various systems of a vehicle, and capable of easily and reliably selecting and operating a desirable switch function corresponding to the particular system from various switch functions.

To achieve the above object, according to a first aspect of the present invention, there is provided a multi-function switch system comprising, a mode selection switch for selecting any one of various switch modes in accordance with a predetermined selecting operation, a display for displaying a mode screen corresponding to a switch mode selected by the mode selection switch and comprising a plurality of divided selection screens, and for displaying an operation state for each of selection screens of the corresponding mode screen, and a clear key disposed on an upper face side of the display for displaying the mode screen displayed on the display, and provided in corresponding to the plurality of divided selection screens, and comprising a plurality of key tops capable of selecting a function in each mode by a pressing operation.

According to a second aspect of the present invention, in the multi-function switch system of the first aspect, an end of each of the key tops is provided with an indicator display for showing which selection screen corresponding to the key top is active.

According to a third aspect of the present invention, in the multi-function switch system of the first aspect, a case body constituting the multi-function switch system has an outward shape which looks like a structure having various apparatuses to be switched, the case body is provided at its upper face with a display window through which the mode display selected by the mode selection switch is displayed, and the clear key on which the plurality of key tops are arranged in correspondence with seat positions of the structure, and the case body is provided at its side face with a dial switch as the mode selection switch.

According to a fourth aspect of the present invention, in the multi-function switch system of the third aspect, the structure is a vehicle, and various systems such as an air conditioner, an audio system a power window, and a door lock are to be switched, and the plurality of clear keys are arranged in correspondence with the seat positions of the vehicle.

According to a fifth aspect of the present invention, in the multi-function switch system of the first aspect, the multi-function switch system further comprises a wireless remote control function for transferring a command corresponding to each of the modes selected by the mode selection switch and the clear key by means of an optical signal or a wireless signal.

According to the first aspect, the display displays the mode screen corresponding to a switch mode selected by the mode selection switch and comprises a plurality of divided selection screens, and displays the operation state for each of the selection screens of the corresponding mode screen. Therefore, when the invention is applied to a vehicle, for example, it is possible to easily find a desired system in a particular portion from systems in various positions in the vehicle by visually checking the operational state (indicator) displayed on the plurality of clear keys, and it is possible to easily and reliably select and operate a desired switch function corresponding to the system in the particular position from the various switch functions by merely pressing the clear key selected from the plurality of clear keys.

Further, the display can display a large number of various switch functions hierarchically. Therefore, the multi-function switch system is applied to a vehicle, for example, even if the number of systems in the vehicle is increased, it is possible to cope with it without changing the design of the display system, and a desired switch function can easily be selected.

Furthermore, a user can visually check the selected mode whenever a mode of the various switch functions is switched and hence, operational error in switch operation of the indicator display for each mode can be prevented.

According to the second aspect, in the plurality of key tops, the indicator showing whether the indicator displayed on the display is displayed by the active indicator is displayed on the key top end of the key top which displays the active indicator and therefore, the user can understand which key should be pressed and can operate irrespective of a mode selected by the mode selection switch and therefore, the use can reliably visually check the indicator which is displayed on each of the plurality of key top.

Thus, when this multi-function switch system is applied to a vehicle, for example, it is possible to more easily and reliably select and operate a desirable switch function corresponding to the particular system from various systems in the cabin, and it is possible to more easily and reliably select and operate a desired switch function corresponding to the system in the particular position from the various switch functions.

According to the third and fourth aspects, the case body has the outward shape which looks like the structure having various systems, and the plurality of clear keys are arranged in correspondence with seat positions of the structure arranged on the clear keys. Thus, it is possible to immediately recognize the seat position in the structure. Further, the mode can be selected by dial operation in such a manner that a user sees the display window through which the mode displayed by the display is displayed and checks the selected mode. Therefore, when this multi-function switch system is applied to a vehicle, for example, it is possible to enhance the operability of the multi-function switch system by a user.

According to the fifth aspect, the multi-function switch system in which the various switch functions integrated has the remote control function. Thus, when this multi-function switch system is applied to a vehicle for example, user can switch the mode of the various switch functions no matter where the user sits.

DETAILED DESCRIPTION OF THE PREFERRED EMBODIMENT

An embodiment of a multi-function switch system according to the present invention will be explained in detail based on the drawings.

Figure 1A:
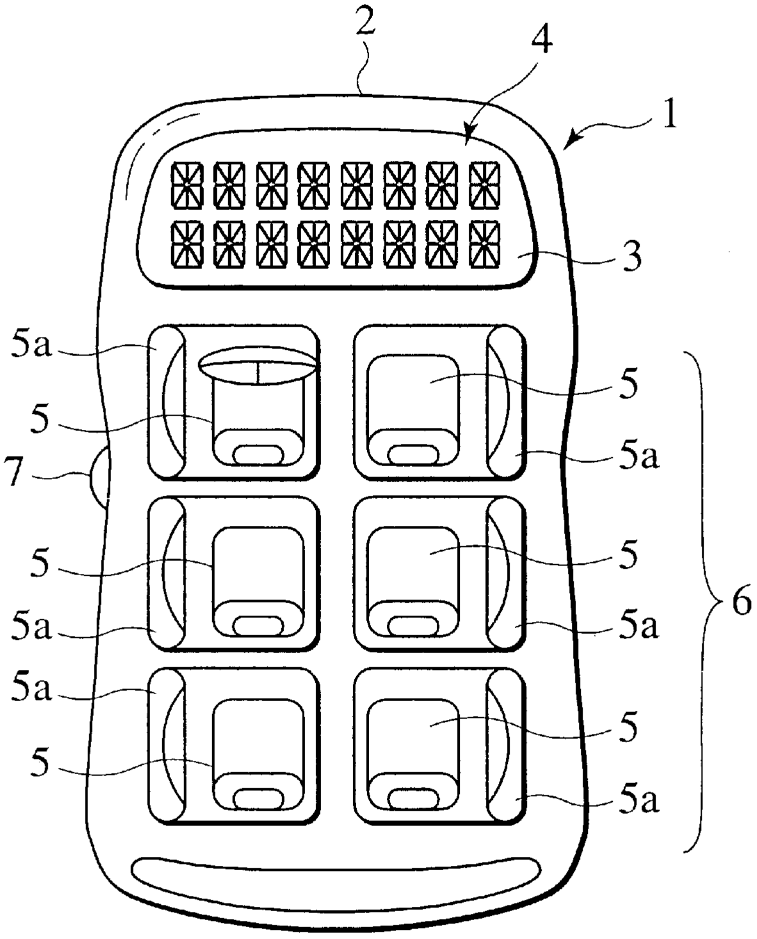
FIGS. 1A to 1C are views of structure showing an outward structure of a multi-function switch system according to the present invention.
Figure 1B:
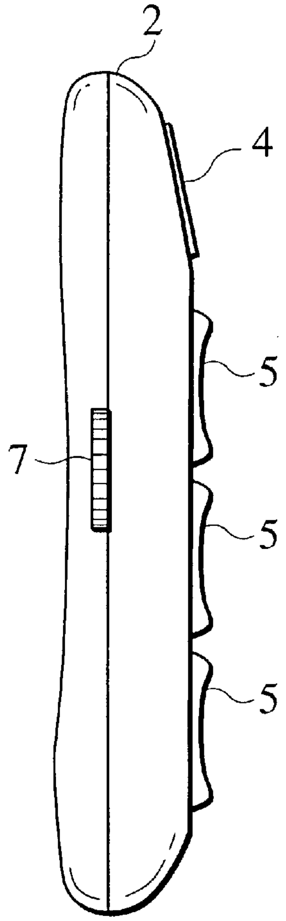
Figure 1C:
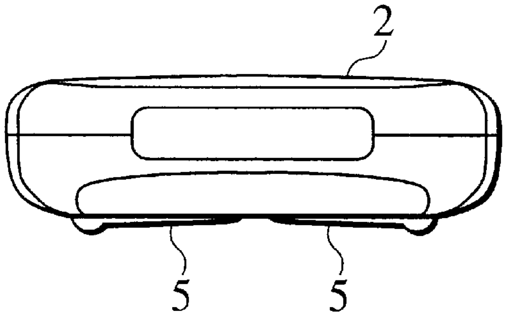
Figure 2:
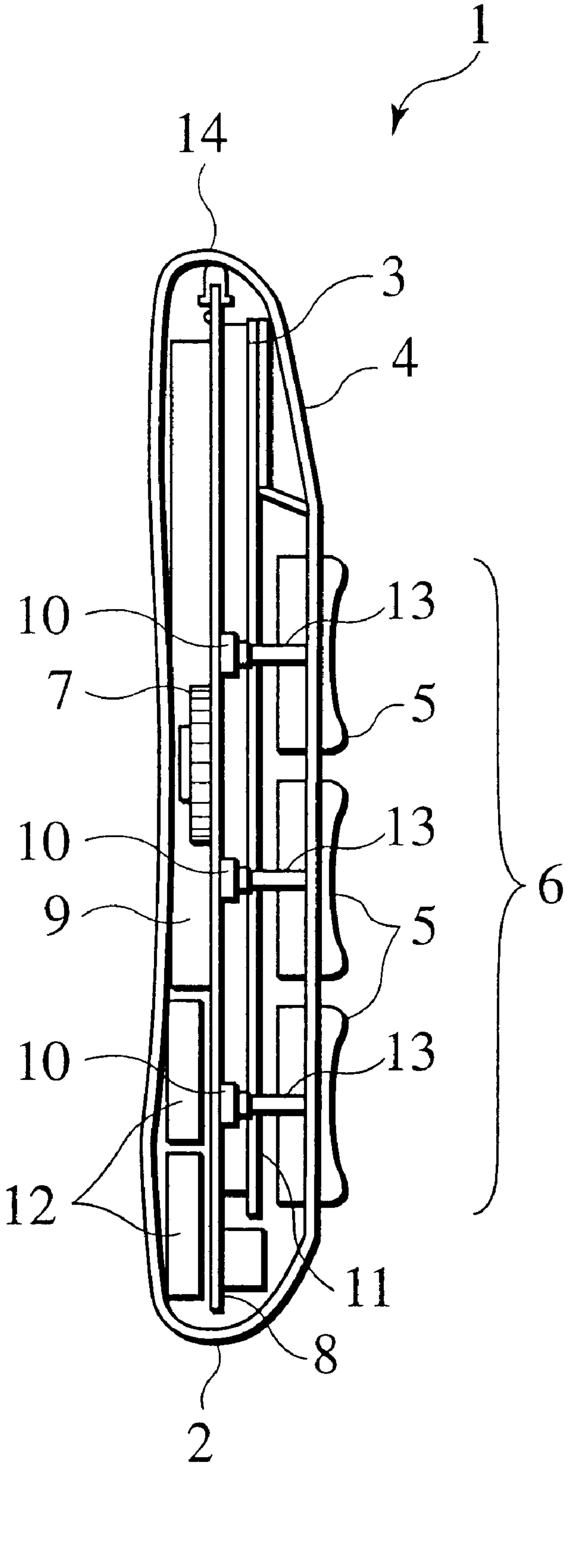
FIG. 2 is a sectional view of an essential portion of the multifunction switch system of the invention.

FIGS. 1 are views of structure of the multi-function switch system of the invention applied to a vehicle, wherein FIG. 1A is a top view, FIG. 1B is a side view and FIG. 1C is a front view. FIG. 2 is a sectional view of an essential portion of the multi-function switch system shown in FIG. 1A.

As shown in each of the drawings, the multi-function switch system 1 in the present embodiment includes a case body 2. The case body 2 has a vechicle-like outward appearance including various systems such as an air conditioner, an audio system, power windows, and door locks. An LCD device 3 is included as a display in the case body 2. The case body 2 is provided at its upper surface with a display window 4 through which a mode screen display on the LCD device 3 is displayed, and a clear key section 6 in which six keys 5 are arranged in correspondence with seat positions of the vechicle. The case body 2 is provided at its side face with a dial switch 7 as a mode selection switch for selecting various modes.

In the LCD device 3, there are defined a mode display area and a plurality of operation display areas. In a multi-display manner, the LCD device 3 can display an operational mode of one system selected by using the dial switch 7 on the mode-display area. The operational mode on the mode-display area is visible to an operator through the display window 4. Further, the LCD device 3 can display actual operative conditions of the system selected in the above way. The actual operative conditions of the system are displayed on the above operation-display areas of the LCD device 3 and are visible to the operator through the clear keys 5, respectively.

The LCD device 3 can display, in a multi-display manner, a mode screen selected using the dial switch 7 and displayed on the display window 4, a selection screen constituting various switch modes and divided into a plurality of sections which are displayed one the key tops 5, and an operating state for each the selected screen in the corresponding mode screen.

Incorporated in the case body 2 are a circuit substrate 8 included in a lower face side of the LCD device 3, a drive circuit 9 provided on a back face of the circuit substrate 8 and including a CPU (not shown) for controlling the multi-function switch system 1, and six switch modules 10 provided in the vicinity of an end of the circuit substrate 8 and corresponding to the clear keys 5. A light source 11 for irradiating the LCD device 3 with light from behind is provided between the LCD device 3 and the circuit substrate 8, and the circuit substrate 8 is provided at its back face side with a battery 12 as a power source.

The six clear keys 5 constituting the section 6 of clear keys 5 can be pressed down by fulcrumming a central portion of the case body 2 and a portion of the key top in the vicinity of a clear key end 5*a*. This causes a rod member 13 provided on a lower face of the clear key 5 to be pressed down. A contact (not shown) in the switch modules 10 is closed by the pressing down movement of the rod member 13, and a corresponding mode is selected. An upper face of each clear key 5 is made of transparent resin or the like, and each mode state (indicator) of each seat can be displayed on each clear key 5. Further, if the LCD device 3 directly below each clear key end 5*a* of the key top 5 is lit, the clear key end 5*a* of the active clear key 5 is lit, and the active indicator can be displayed to inform of the active state. In order to make it easy to see the active indicator display, an exclusive optical device such as an LEL may be disposed in each clear key end 5*a* of the clear key 5 to display the active indicator, instead of lighting the LCD device 3.

The multi-function switch system 1 is provided with a remote control function capable of transferring a command corresponding to each mode to a vehicle network system for controlling the various systems, and as means for realizing this function, an infrared-communication module 14 is used. The command may be transferred by wireless communication instead of infrared-communication.

Figure 3:
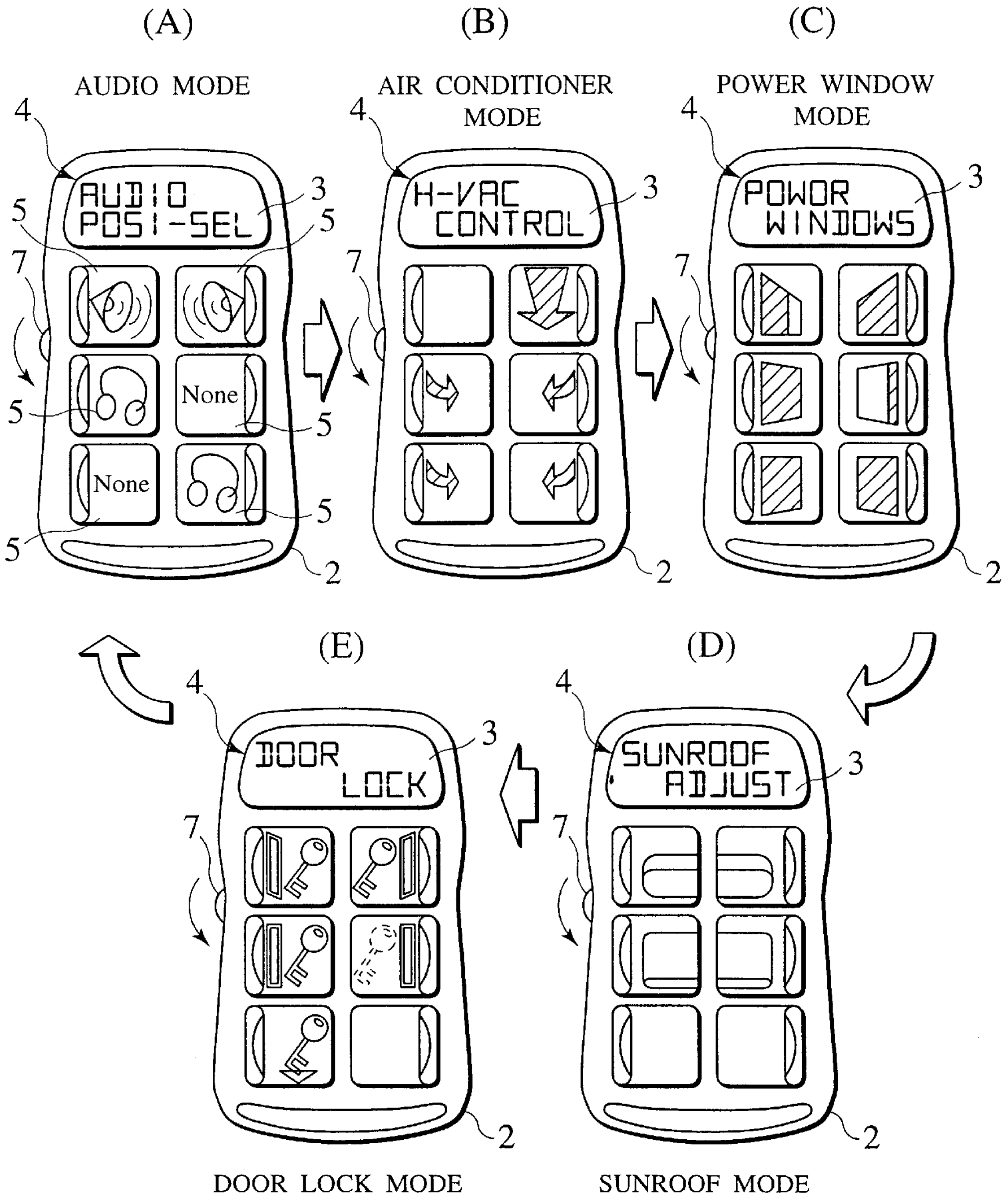
FIG. 3 is a view of mode transitions showing one example of a mode selecting process in the multi-function switch system shown in FIGS. 1 and 2.
Figure 4:
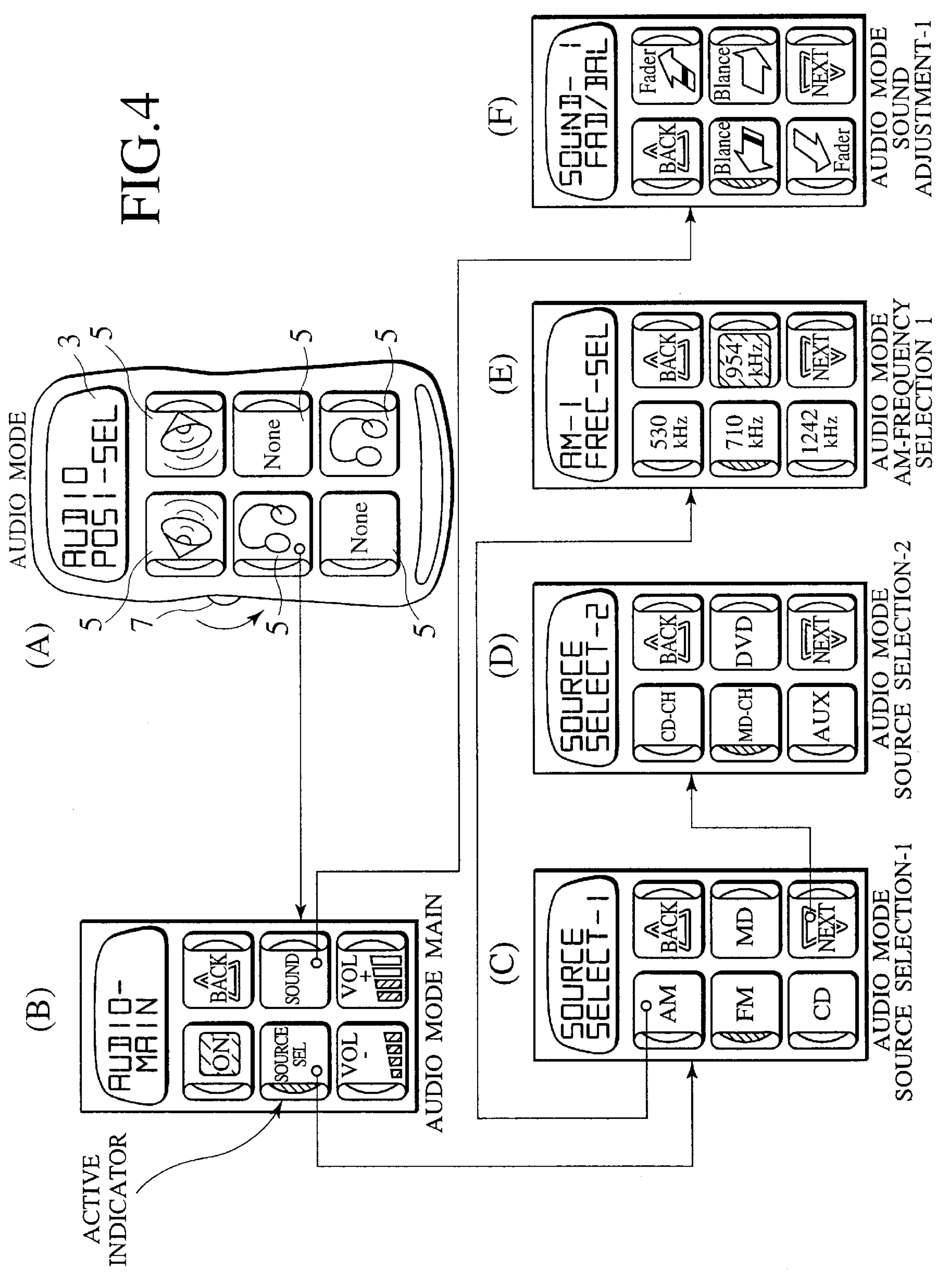
FIG. 4 is a view of transitions showing one example of active indicator display after mode is selected in the multi-function switch system shown in FIGS. 1 and 2.

FIG. 3 is a view showing one example of the mode selecting process in the multi-function switch system shown in FIGS. 1 and 2, and FIG. 4 is a view showing one example of active indicator display after the mode is selected in the multi-function switch system shown in FIGS. 1 and 2.

As shown in FIGS. 3, whenever the dial switch 7 is operated to switch the modes of various switch functions, the mode display of each switch function is changed in the following manner for example: an audio mode shown in FIG. 3(A)→an air conditioner mode shown in FIG. 3(B)→a power window mode shown in FIG. 3(C)→a sunroof mode shown in FIG. 3(D)→a door lock mode shown in FIG. 3(E). If the change of mode display is visually checked to stop the dial switch 7 at a desired mode position, the desired mode is selected.

When a desired mode is to be selected, an indicator display corresponding to a mode displayed on the LCD device 3 is displayed on each of the six clear keys 5. For example, if the dial switch 7 is stopped at the audio mode shown in FIG. 4(A), indicator display (operational state display) corresponding to the audio mode is displayed on each of the six clear keys 5. For example, the air conditioner mode shown in FIG. 3(B) shows that the volume of air on the driver's seat side is strong, no wind is blowing on the passenger seat side, and the volume of wind in second and third rows is weak. In this state, if the clear key 5 corresponding to each seat is pressed, the operation screen of the air conditioner for that seat is displayed. Further, a state display in the power window mode shown in FIG. 3(C) indicates that a driver's seat side window, a left window in a second row, and left and right windows in a third row are closed, and a passenger seat side window is one-third opened, and a right window in the second row is almost fully opened.

The LCD device 3 display the indicator indicating that the active indicator is displayed on the key top end of the key top on which the active indicator is displayed.

Next, a concrete example will be explained with reference to state transition views shown in FIG. 4.

FIG. 4 shows the concrete example capable of displaying the indicator actively in a multi-stage manner hierarchically in each of the six clear keys 5 while taking the case of the audio mode selected by the mode selection mode. For example, when an indicator of a headphone is displayed on a clear key 5 corresponding to a left seat in the second row as shown in FIG. 4(A) and if a user desires to use the headphone, the user can use the headphone on the left seat in the second row by pressing the clear key 5 corresponding to the left seat in the second row.

In this state, if the clear key 5 corresponding to the left seat in the second row is pressed as shown in FIG. 4(B), a main screen of the audio mode is displayed on the LCD device 3. An indicator concerning the headphone is displayed on each of the six clear keys 5. At that time, an active indicator in which the clear key end 5*a* of the active clear key 5 is lit is indicated and hence, the user can understand which key should be pressed and can operate the correct key. Therefore, the convenience is enhanced.

In the state where the indicator concerning this headphone is displayed, an active indicator is displayed on a clear key 5 on which "SOURCE SEL" is displayed, and this clear key 5 functions as a sound source selection switch. If this clear key 5 is pressed, the screen is switched, and sound information source to which the user desires to listen using the headphone, such as AM radio, FM radio, CD and MD, is displayed on each of the six clear keys 5 as shown in FIG. 4(C).

If the sound information source to which the user desires to listen is not displayed on the indicator display, a clear key 5 on which "NEXT" is displayed is pressed. With this pressing operation, another indicator indicating the sound information source to which the user desires to listen is displayed on each of the six key clear keys 5 as shown in FIG. 4(D).

Further, even if the sound information source to which the user desires to listen is not displayed on the indicator display in FIG. 4(D), if there is no clear key 5 on which "NEXT" is not displayed in this indicator display ("NEXT" is displayed thinly in this case), another indicator concerning the sound information source to which the user desires to listen can not be displayed. In such a case, if a clear key 5 on which "BACK" is displayed is pressed, the display can be returned to the state shown in FIG. 4(C). In the state of indicator display shown in FIG. 4(C), if a clear key 5 on which "BACK" is displayed is pressed, the display can be returned to the state shown in FIG. 4(B).

If "AM" is selected as the sound information source to which the user desires to listen, if a clear key 5 on which "AM" is displayed is pressed, an indicator concerning the frequency band to which the user desires to select is displayed on each of the six clear keys 5 as shown in FIG. 4(D). Here, if frequency band of "954 kHz" is selected, sound information of this frequency band is output from the headphone.

Further, as shown in FIG. 4(B), if a clear key 5 on which "SOUND" is displayed is pressed in a state where an indicator concerning a headphone is displayed on each of the six clear keys 5, an indicator concerning "SOUND" adjustment is displayed on each of the six clear keys 5. Here, when it is unnecessary to adjust the sound, if a clear key 5 on which "BACK" is displayed is pressed, the display can be returned to the state of indicator display shown in FIG. 4(B). If a clear key 5 on which "NEXT" is displayed is pressed, another indicator (not shown) concerning the sound adjustment is displayed.

As described above, it is possible to easily find a desired system in a particular portion from systems in various positions in the vehicle by visually checking the indicators displayed on the plurality of clear keys 5, and it is possible to easily and reliably select and operate a desired switch function corresponding to the system in the particular position from the various switch functions only by pressing the clear key selected from the plurality of clear keys 5.

In addition, the indicator can be displayed actively in a multi-stage manner hierarchically in each of the six clear keys 5 for an indicator function mode shown by the mode selection switch. Therefore, a display can indicate a large number of various switch functions efficiently, even if the number of systems in the increased, it is possible to adapt to it without changing the design of the display system, and it is possible to easily select a desired switch function.

Figure 5:
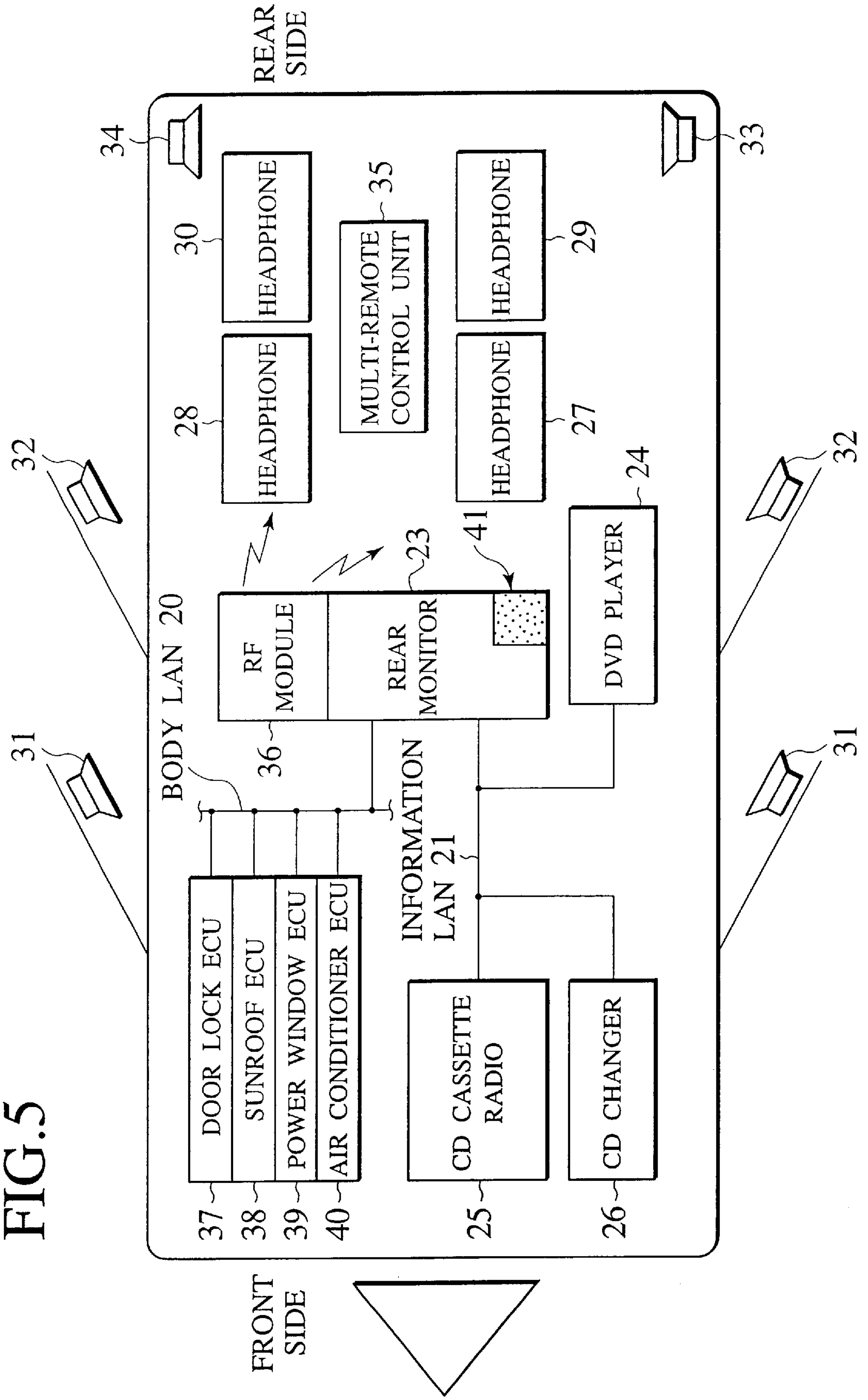
FIG. 5 is a schematic view showing one example of a vehicle electric equipment system to which the multi-function switch system of the invention can suitably be applied.

The multi-function switch system 1 in the above-explained embodiment can preferably be applied to a vehicle transfer system shown in FIG. 5.

That is, when an electric equipment system mounted in a vechicle includes a DVD player 24 in a network comprising a rear monitor 23 to which a body LAN 20 and an information LAN 21 are connected, a headphone system is required for a rear side. Further, if an audio system such as a CD cassette radio 25 and a CD changer 26 is connected through the information LAN 21 is commonly used by a plurality of headphones 27 to 30 and speakers 31 to 24.

In such a case, it is necessary to operate the switch on the rear seat side without recourse to operation on the front seat side. Therefore, the multi-function switch system of the present invention operated in the above-described manner is effective to meet such a requirement. In FIG. 5, a numeral 35 represents a multi-remote control unit, a numeral 36 represents an RF module, a numeral 37 represents a door lock ECU, a numeral 38 represents a sunroof ECU, a numeral 39 represents a power window ECU, a numeral 40 represents an air conditioner, and a numeral 41 represents 41 represents a remote control unit photo-receiver/emitter.

The embodiment has been described while taking the case of the multi-function switch system 1 of the present invention applied to a vehicle, but it is of course possible to apply the multi-function switch system 1 to a construction such as a multimedia housing variously proposed in recent years for forming a better housing environment.

That is, the multimedia housing is formed in an intelligential manner in which a communication line connecting rooms is wired in a house to form a LAN, and various systems such as a lighting, an electric curtain, an electric shutter, an air conditioner, an electric carpet, a gas boiler, a housing medical equipment, an inter-phone, an audio system, and a DVD player are connected to the LAN together with an information processing unit, and the various systems in the house are operated under control the information processing unit. This structure is similar to the electric equipment system of the vehicle shown in FIG. 5. Therefore, when the multi-function switch system 1 of the invention is applied to the house, it is possible to easily and reliably select and operate a desirable switch function corresponding to the particular system from various systems in the house, and it is possible to easily and reliably select and operate a desired switch function corresponding to the system in the particular position from the various switch functions. In this case, the switch body 2 is formed into the house, and a layout having the same disposition in the housing is displayed on the LCD device 3.

DEPOSIT OF COMPUTER PROGRAM LISTINGS

Not Applicable

What is claimed is:

1. A multi-function switch device for selecting and controlling any of a plurality of operational modes of a plurality of systems, the multi-function switch device comprising:

- a case body having a transparent display window fixed thereto and a plurality of clear keys movably attached to the case body, the clear keys being formed from a transparent material;
- a mode selection switch arranged on the case body for allowing an operator to select any one of the operational modes of the systems;
- a display unit accommodated in the case body so as to underlie the transparent display window and the clear keys, the display unit having a mode-display area defined therein to indicate the operational mode of the system selected by the mode selection switch through the transparent display window, and a plurality of operation-display areas defined to indicate various operative conditions of the system in accordance with the operational mode through the clear keys; and
- a drive circuit accommodated in the case body to drive the display unit, the drive circuit being connected to the mode selection switch to thereby allow the display unit to display the operational mode and the operative conditions of the system selected.

2. The multi-function switch device of claim 1, wherein each of the clear keys is provided, at an end thereof, with an indicator for indicating whether information about the system displayed through the corresponding clear key is active.

3. The multi-function switch device of claim 1, wherein the case body is shaped to simulate an outline of a structure including the systems, and the clear keys are arranged on the case body so that respective locations of the clear keys correspond to relative locations of the structure, and wherein the mode selection switch is located on a side face of the case body.

4. The multi-function switch device of claim 3, wherein the structure including the systems to be selected and controlled is a vehicle and the systems include at least one of a ventilating system, an audio system, a door lock system, and a window actuating system, and wherein the clear keys are located on the case body so as to substantially correspond to respective seat positions of the vehicle.

5. The multi-function switch device of claim 1, further comprising a wireless remote control unit accommodated in the case body to transmit a command to operate each of the systems via at least one of an optical signal and a wireless signal.

* * * * *

UNITED STATES PATENT AND TRADEMARK OFFICE

CERTIFICATE OF CORRECTION

PATENT NO. : 6,429,542 B1 Page 1 of 1
DATED : August 6, 2002
INVENTOR(S) : Yoshiyuki Furuya and Kunimitsu Aoki It is certified that error appears in the above-identified patent and that said Letters Patent is hereby corrected as shown below:

<u>Title page,</u>
Item [57], ABSTRACT,
Line 6, "and" should read -- an --.

Signed and Sealed this

Fourth Day of February, 2003

JAMES E. ROGAN
*Director of the United States Patent and Trademark Office*